J. C. BARRETT.
END HITCH FOR HARROWS.
APPLICATION FILED JAN. 9, 1919.
1,318,829.
Patented Oct. 14, 1919.
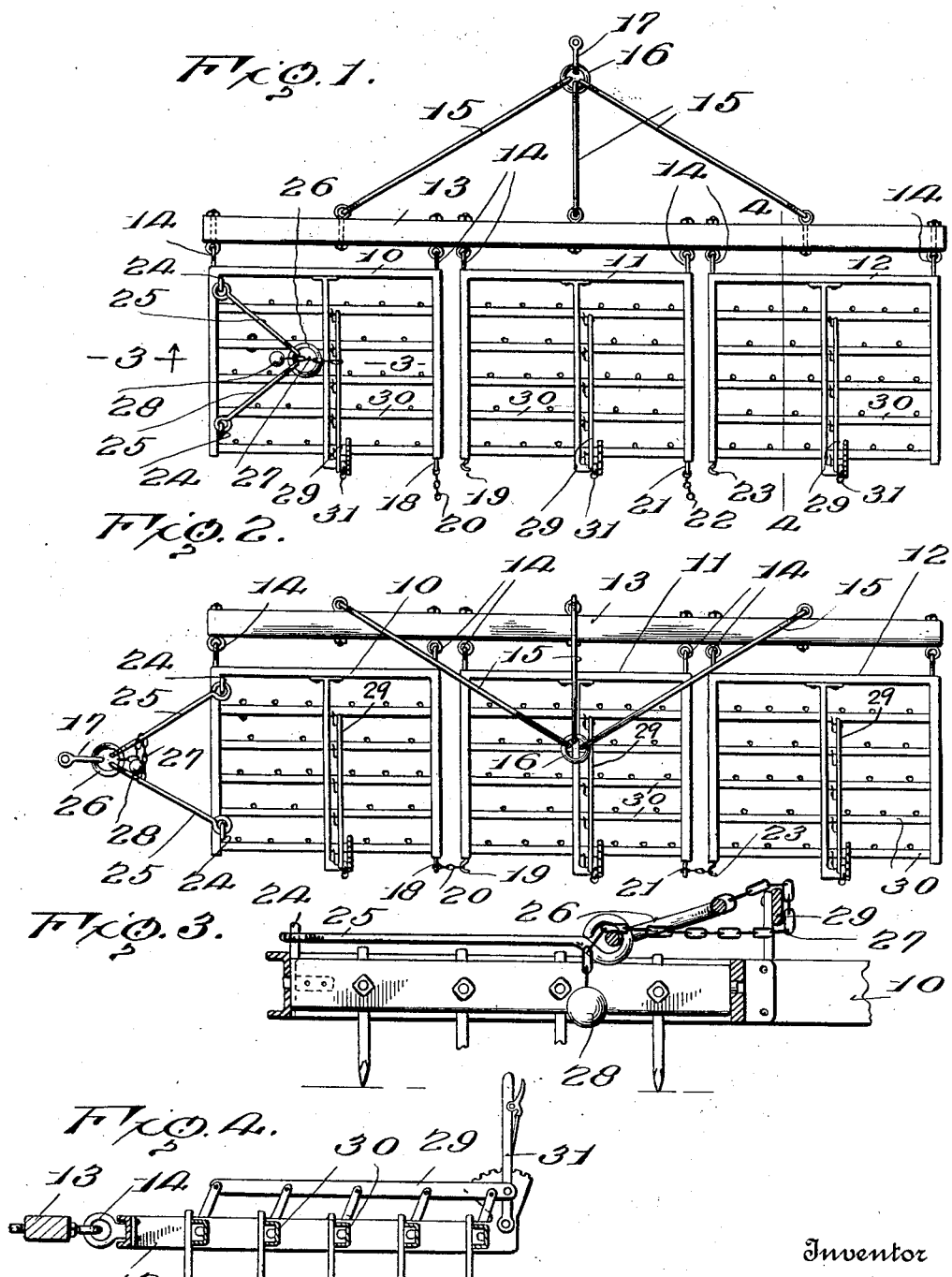
Inventor
J. C. Barrett

UNITED STATES PATENT OFFICE.

JOSEPH C. BARRETT, OF BIG FOOT, ILLINOIS.

END HITCH FOR HARROWS.

1,318,829.   Specification of Letters Patent.   Patented Oct. 14, 1919.

Application filed January 9, 1919. Serial No. 270,291.

*To all whom it may concern:*

Be it known that I, JOSEPH C. BARRETT, a citizen of the United States, residing at Big Foot, in the county of McHenry, State of Illinois, have invented certain new and useful Improvements in End Hitches for Harrows; and I do hereby declare the following to be a full, clear, and exact description of the invention, such as will enable others skilled in the art to which it appertains to make and use the same.

This invention relates to new and useful improvements in harrows, and particularly to means whereby the harrow may be drawn sidewise through narrow gateways, or across bridges which are too narrow to permit the harrow to pass frontwise.

One object of the present invention is to provide a novel and improved device for attachment to the side of one of the end sections of the harrow, whereby the harrow may be easily drawn sidewise.

Another object is to provide a novel and improved means for securing the side draft means while the harrow is in use.

A further object is to provide a novel and improved means for connecting the sections of the harrow, while being drawn sidewise, whereby all of the sections will be held in proper alinement.

Other objects and advantages will be apparent from the following description when taken in connection with the accompanying drawing.

In the drawing:

Figure 1 is a top plan view of the harrow when in ordinary use, the side draft means being folded back out of the way on the harrow section to which it is connected.

Fig. 2 is a top plan view of the harrow equipped with the invention, and when ready to be drawn sidewise.

Fig. 3 is an enlarged vertical longitudinal sectional view taken on the line 3—3 of Fig. 1.

Fig. 4 is an enlarged sectional view taken on the line 4—4 of Fig. 1.

Referring particularly to the accompanying drawing, 10, 11, and 12, represent the sections of the harrow which are connected to the evener bar 13 by the flexible connections 14. Forwardly converging draft rods 15 are connected to this bar, and have their forward ends connected to the ring 16, which carries the clevis 17. Secured to the inner rear corner of the section 10 is an eye- bolt 18 which carries a short length of chain 20 for engagement with the hook-bolt 19 carried by the adjacent corner of the section 11. A similar eye-bolt 21 is secured to the other rear corner of the section 11, and carries a chain 22 for engagement with the hook-bolt 23 carried by the inner rear corner of the section 12. Thus the rear sides of the harrow sections will be held in proper alinement while being drawn.

Carried by the forward and rear outer corners of the section 10 are the eye-bolts 24, and connected to each of said bolts is a rod or link 25, the other ends of said links being connected to a ring 26, which is adapted to carry the clevis 17, before mentioned, and as clearly shown in Figs. 1 and 2. The clevis is adapted for engagement with the ring 16 when the harrow is in its ordinary use, and with the ring 26 when the harrow is to be drawn sidewise. Connected to the ring 26 is a length of chain 27, the other end being provided with a ball weight 28.

Each of the harrow sections has the forwardly and rearwardly extending bar 29 which is connected to the tooth-bars 30 of the harrow and which is rocked by the lever 31. This bar, as clearly seen in Figs. 3 and 4, extends a suitable distance above the harrow section.

When the harrow is to be drawn sidewise, as shown in Fig. 2, the draft links 15 are folded over on the tops of the harrow sections, and the clevis 17 engaged with the ring 26 and the animals hitched to the clevis. The short chains 20 and 22 are then engaged with the hooks 19 and 23, when the harrow can be easily drawn where desired. Thus the harrow can be drawn over a bridge or through a gateway which would be too narrow to permit the movement of the harrow frontwise. When the harrow is in its ordinary use, the side draft links are folded over on the section 10, the chain 27 being passed under the bar 29 and through the ring, the weight depending therefrom and holding the parts against displacement.

What is claimed is:

1. The combination with a harrow having a tooth-bar shifting member, of a draft means carried on one end of the harrow and foldable onto the harrow adjacent the shifting member, and means carried by said draft means for engagement with the shifting member to hold the draft means in folded position.

2. The combination with a harrow section having a tooth bar shifting member, of a pair of converging links connected to one side of said section, a ring connecting the converging ends of the said links, a chain carried by said ring and provided with a weight, said links being adapted to be folded onto the harrow section and the chain engaged around said shifting member and through said ring.

3. The combination with a harrow having a tooth-bar shifting member, of a draft means carried by one end of the harrow and foldable onto the harrow, said draft means including a ring, and a flexible weighted means carried by the ring for engagement with the shifting member and the ring to hold the draft means in such folded position.

In testimony whereof I affix my signature in the presence of two witnesses.

JOSEPH C. BARRETT.

Witnesses:
  LESTER LEEDLE,
  ALBERT BUTTS.

Copies of this patent may be obtained for five cents each, by addressing the "Commissioner of Patents, Washington, D. C."